Oct. 26, 1971  H. WEBER ET AL  3,614,823
METHOD OF EXCHANGING GARLAND ROLLER SETS OF CONVEYOR
INSTALLATIONS AND MEANS FOR CARRYING OUT SAME
Filed April 11, 1969  6 Sheets-Sheet 1

Inventors:
Heinz Weber
Hans Pelzer
By
Walter Becker

Oct. 26, 1971    H. WEBER ET AL    3,614,823
METHOD OF EXCHANGING GARLAND ROLLER SETS OF CONVEYOR
INSTALLATIONS AND MEANS FOR CARRYING OUT SAME
Filed April 11, 1969    6 Sheets-Sheet 6
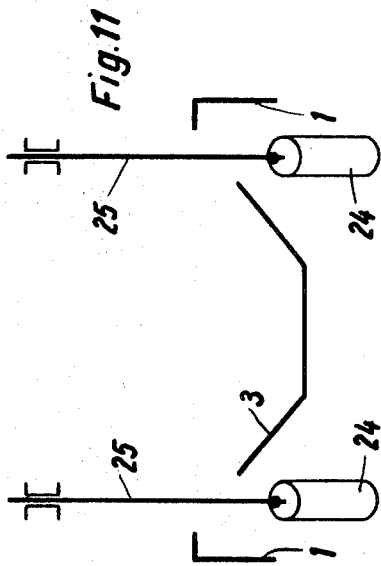
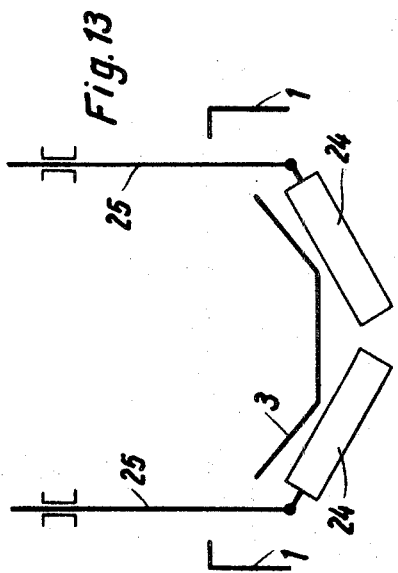
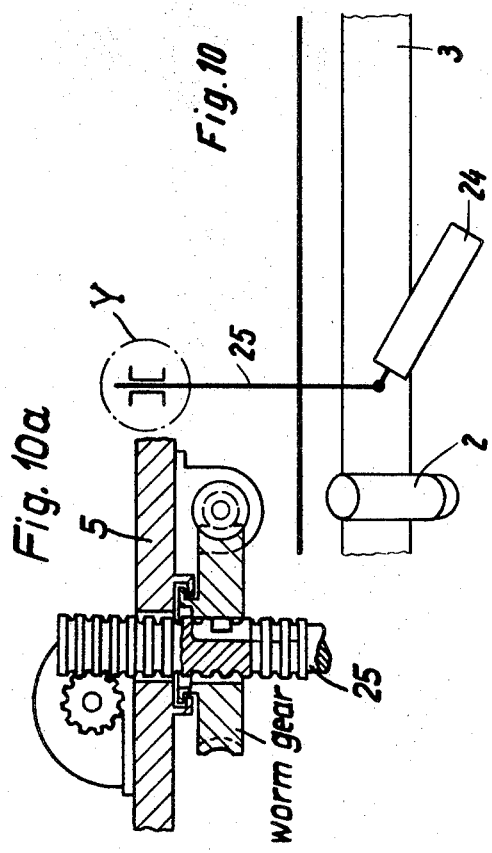
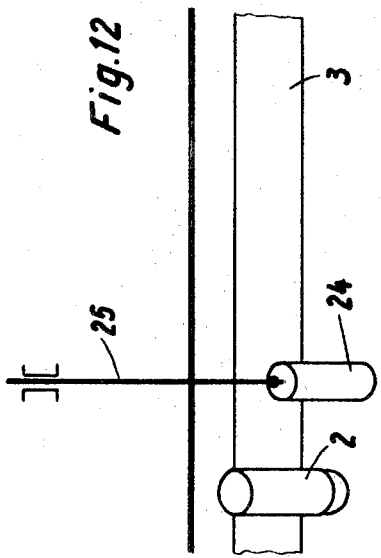
Inventors:
Heinz Weber
Hans Pelzer
By Walter Becker United States Patent Office 3,614,823
Patented Oct. 26, 1971

3,614,823
METHOD OF EXCHANGING GARLAND ROLLER SETS OF CONVEYOR INSTALLATIONS AND MEANS FOR CARRYING OUT SAME
Heinz Weber, Krefeld-Traar, and Hans Pelzer, Krefeld, Germany, assignors to Fried. Krupp Gesellschaft mit beschrankter Haftung, Essen, Germany
Filed Apr. 11, 1969, Ser. No. 815,402
Claims priority, application Germany, Apr. 11, 1968, P 17 56 158.9
Int. Cl. B23p 19/00
U.S. Cl. 29—200 A                   7 Claims

ABSTRACT OF THE DISCLOSURE

A method of and cart for exchanging a garland roller set of a belt conveyor, according to which the cart is equipped with two laterally arranged hoisting means adapted in cooperation with each other to pull one roller set out from underneath the conveyor belt while simultaneously and at the same rate said roller set is being pulled out another replacement roller set is pulled into the position previously occupied by said first mentioned roller set.

---

The present invention relates to the exchange of garland roller sets of conveyor belt installations and to maintenance carriages for effecting such exchange.

It is an object of the present invention to provide for an improved exchange of such roller sets and it is also an object of this invention to service and maintain particularly very long conveyor installations in a reliable manner.

These and other objects and advantages of the invention will appear more clearly from the following specification, in connection with the accompanying drawings, in which.

Figure 3:
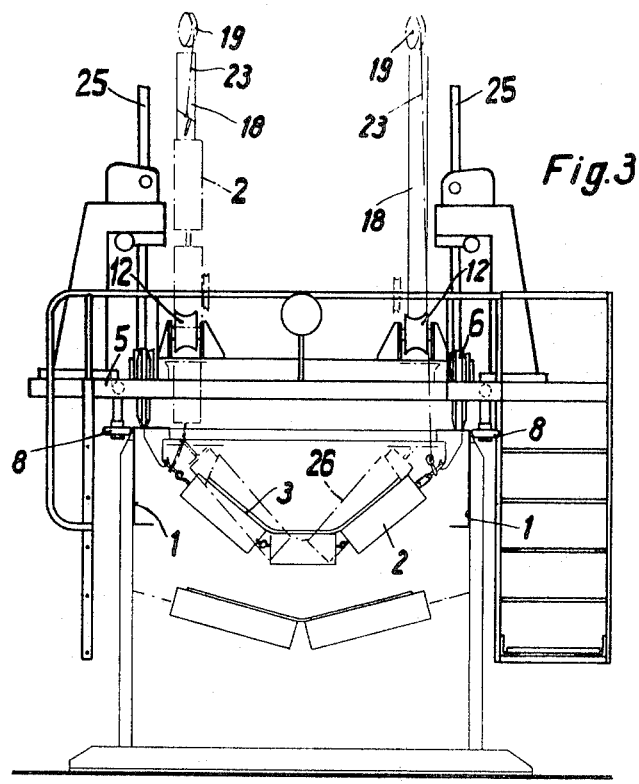
FIG. 3 represents a cross section through a conveyor installation with a view of the maintenance carriage.
Figure 3A:
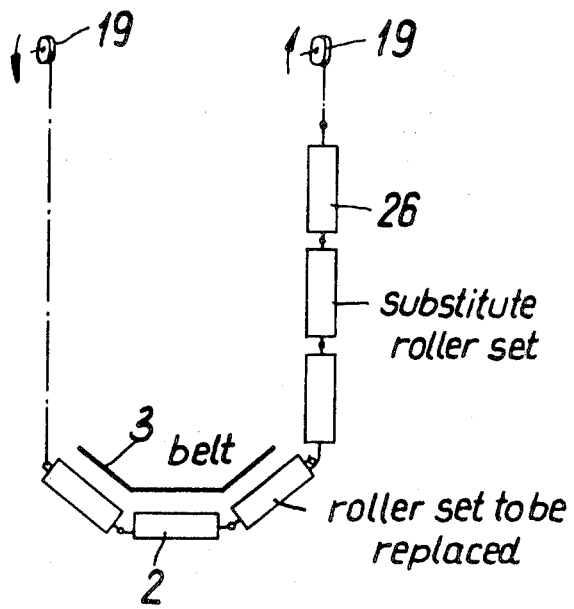
Figure 3B:
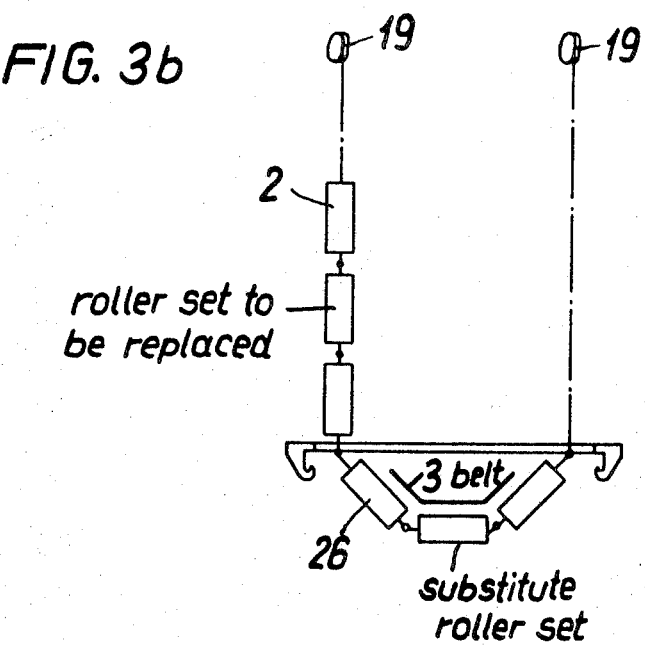
Figure 9:
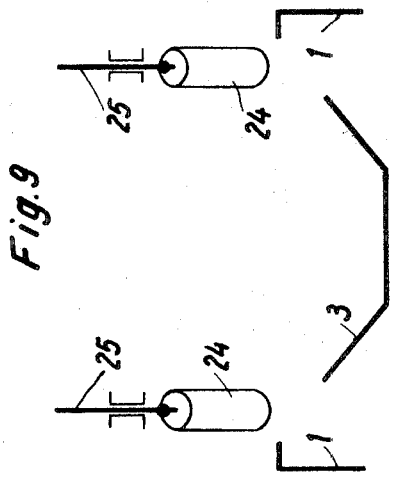
Figure 7:
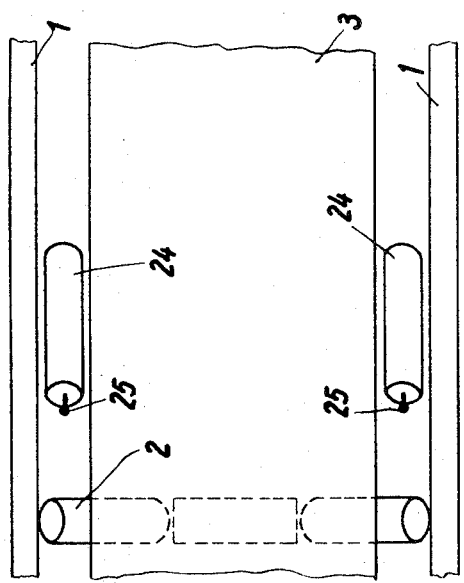
Figure 8:
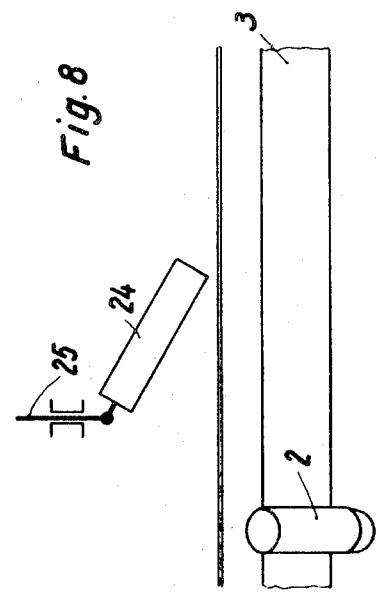

FIGS. 3a and 3b respectively schematically illustrate the exchange of two garland roller sets in two different positions.

Figure 1:
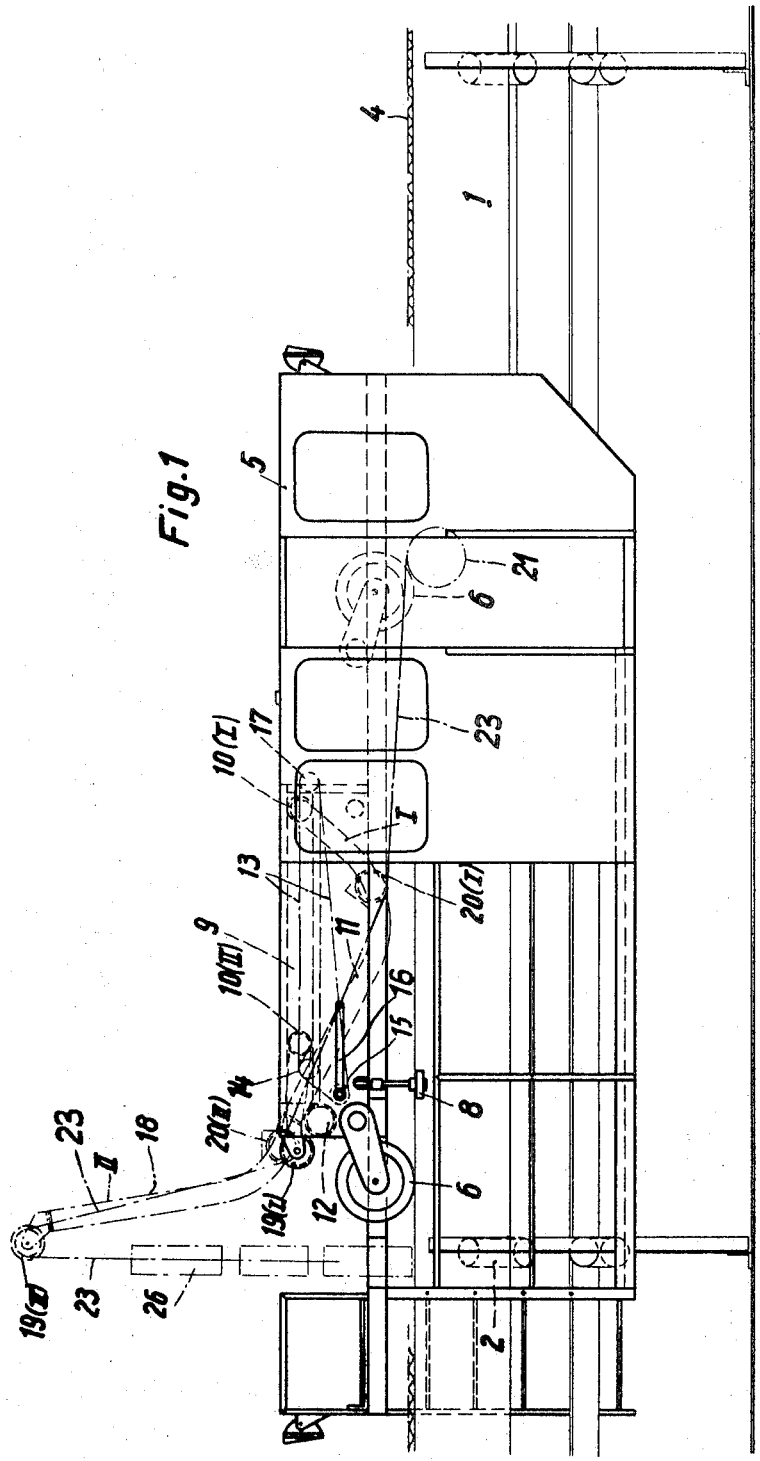
FIG. 1 is a side view of a maintenance or servicing carriage according to the invention.
Figure 2:
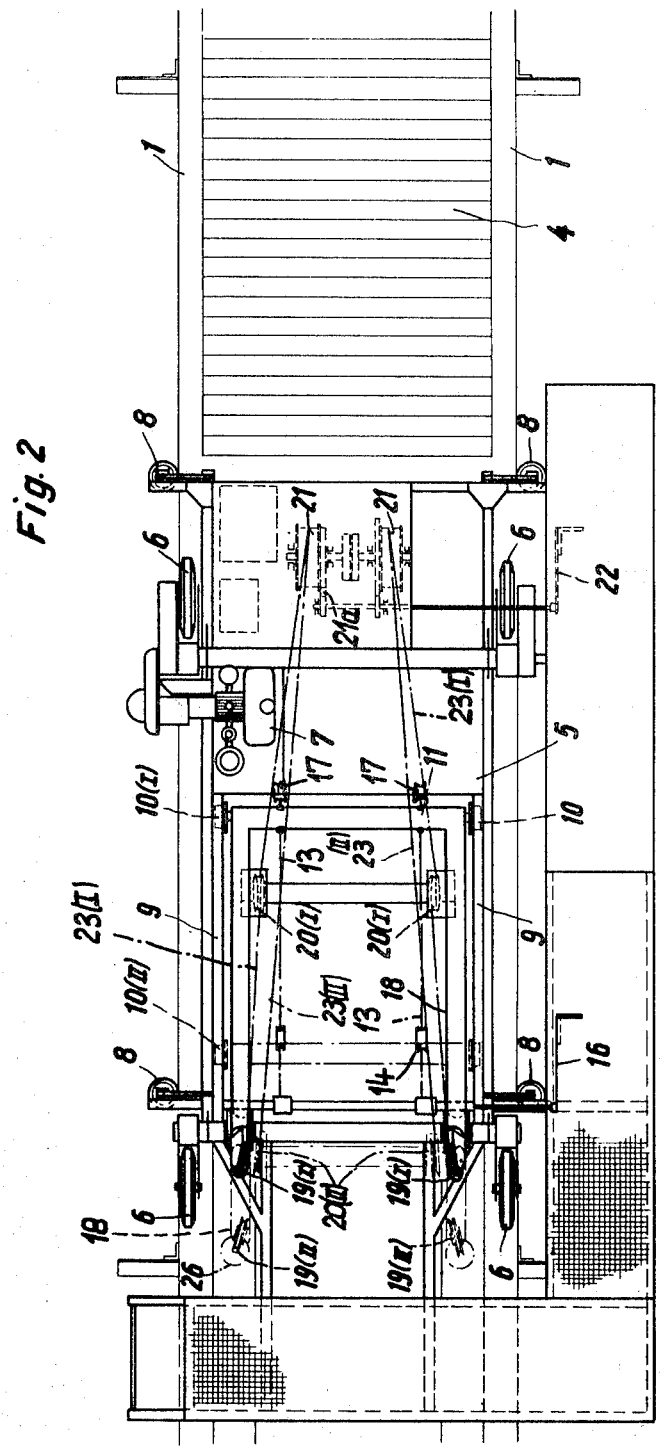
FIG. 2 is a top view of the carriage of FIG. 1.
Figure 4:
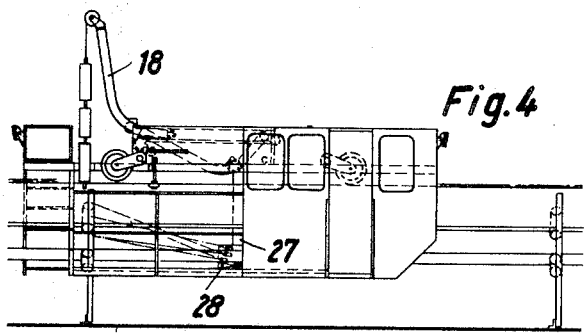
Figure 6:
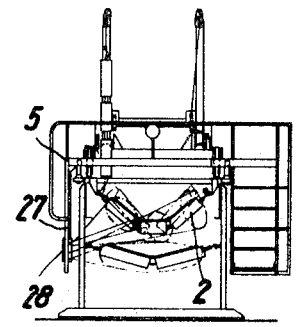
Figure 5:
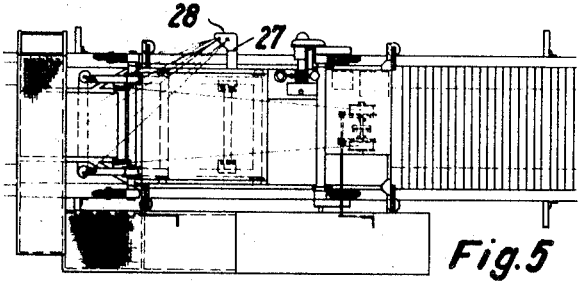

FIGS. 4, 5 and 6, represent illustrations corresponding to FIGS. 1, 2 and 3, with receiving devices.

FIGS. 7–13 respectively illustrate supporting rollers on the servicing carriage in different positions.

FIG. 10a shows a detail indicated diagrammatically only in FIG. 10 within the dot-dash line wide Y.

The present invention is seen primarily in that the conveyor belt above the garland roller set to be removed is relieved and that one end of said roller set is connected to the load receiving means of a hoisting device whereas the other end of the roller set is connected to one end of the garland roller set to be installed, which last mentioned roller set has its other end suspended on a further hoisting device. The two ends of the garland roller set to be removed are detached from the framework of the conveyor belt whereupon the load receiving means of the first hoisting device is hauled in and the load receiving means of the other hoisting device is lowered.

The invention also concerns a servicing or maintenance carriage for a conveyor belt installation for carrying out the method of the present invention. With this carriage the two hoisting devices have booms, or the like, which are journalled at one end of the carriage frame movable over the conveyor belt and, more specifically, on both sides of the conveyor belt so as to be pivotable about axes transverse to the driving direction. These booms are adapted to be pivoted from one operative position in which they extend upwardly from the said frame to an inoperative position in which they do not, or only slightly protrude beyond the profile of the carriage frame.

Referring now to the drawings in detail, the framework of the conveyor has two spars or girders 1 having suspended thereon at relatively large distances from each other, a plurality of garland roller sets 2. Each roller set 2 comprises three rollers for the taut section 3 of the conveyor belt. Also suspended on said conveyor frame are two sectional roller sets for the slack belt section. Mounted on the conveyor frame are also corrugated sheet metal plates 4 to cover the conveyor belt. Displaceably arranged on the spars or girders 1 of the framework of the conveyor is the frame 5 of the servicing carriage which is provided with four wheels 6, two of which are driven by a motor 7. The frame 5 is guided by rollers 8 which engage the outsides of the spars or girders 1. At both sides in the frame 5 are provided two guiding rails 9 which are horizontally arranged. In these guiding rails 9 there are guided two wheels 10 of a U-shaped yoke 11, the legs of which on both sides of the frame 5 extend rearwardly and with a bend extend upwardly. The legs 11 rest on throat rollers 12 which are journalled at the rearward end of the frame 5. The front end of the yoke 11 is engaged by two ropes 13 which through the intervention of deviating rollers 14 journalled near the rearwardly end of the frame 5 are passed to winding rollers 15. These rollers 15 around which the cables 13 have been wound may be driven by means of a crank 16. From the winding rollers 15, the cables 13 pass over deviating rollers 17 at the front end of the guiding rails 9 to the front end of the yoke 11. By rotating the crank 16, the yoke 11 may be moved from one end position I to a second position II, and vice versa. In the end position I, the wheels 10 are at the front end of the guiding rails 9, whereas the legs of the yoke 11 rest on the throat rollers 12 near the ends of said legs. The yoke 11 does, in this instance, not protrude beyond the profile servicing carriage. In the end position II in which the wheels 10 have been moved as far toward the rear as possible, the legs of the yoke 11 rest in the vicinity of their bend upon the throat rollers 12 whereas the adjacent arms 18 of these legs in the form of booms are directed steeply upwardly.

The ends of the arms 18 are provided with deviating rollers 19. Furthermore, deviating rollers 20 are provided at the legs of the yoke 11 in the vicinity of the bends. At the front portion of the frame 5 there are journalled two drums 21 of a cable winch which drums can be coupled to each other either directly or through the intervention of a reversing transmission 21a. The drive is effected by means of a crank 22. From the two drums 21 cables 23 are passed over the deviating rollers 20 and 19.

For purposes of exchanging a garland roller set 2, first above said roller set, the taut belt section 3 is lifted. This is effected by means of two supporting rollers 24, the axles of which are in the manner of a cantilever connected to two rods 25 on both sides of the conveyor belt. These two rods 25 are displaceable in the frame 5 in vertical direction and are journalled so as to be rotatable about their vertical axes. Normally, the supporting rollers 24 occupy the position shown in FIGS. 7–9. These rollers 24 are located on both sides of the conveyor belt and extend with downwardly inclined axes in the direction of the advancing movement of the carriage at such a height that they are located completely above the belt frame. When it is desired to exchange a garland roller set 2, the supporting rollers 24 are lowered to the position shown in FIGS. 10 and 11 and subsequently are turned into the position of FIGS. 12 and 13. In this position they extend below the taut belt section 3. Thereupon, it is possible by lifting the rods 25 to lift the taut section of the belt so that the garland set 2 will be relieved. Thereupon the one cable 23 which hangs downwardly from the deviating roller 19 at the tip of one upwardly directed arm 18 is connected to that end of the roller set 2 which is located on the respective side of the belt frame. The other cable 23, and more specifically its end hanging downwardly from the respective deviating roller 19 carries the garland roller set 26 to be installed. The lower end of this set is connected to the respective end of the garland set 2 to be removed. After the two ends of this roller set have been disengaged from the belt frame, first the cable 23 is pulled in and the other cable 23 is let out. This is brought about by rotating the crank 22 while the two drums 21 are driven through the intervention of a reversible drive. In this way the garland roller set 2 is pulled out from below the lifted slack section of the belt, and simultaneously the roller set 26 is "threaded." When the roller set 26 has reached its final position on the belt frame, its two ends are connected to the spars or girders 1, while the garland roller set 2 is carried along by the carriage. Thereupon the taut section of the belt is lowered by means of the supporting rollers 24 so that it will engage the newly installed roller set 26.

When removing a garland roller set, the upper or taut belt section has to be lifted only slightly from the roller set when the latter by means of the cable winch 21 is lowered sufficiently. The exchange of the garland roller sets may in this way be effected while the belt is in operation.

The servicing carriage may also be employed to check the conveyor belt installation as to whether individual belt supporting rollers are damaged or do not rotate properly or at all. If the belt supporting rollers are damaged, noises will occur, whereas in the second instance heat radiation will occur. Laterally on the frame 5, as indicated in FIGS. 4-6, there is provided an arm 27 which is so located that it is movable laterally on the belt frame. At the lower end of the arm 27 for ascertaining the above mentioned noises, there is provided a control microphone, whereas the occurrence of heat rays is ascertained by an ultrared installation. These receivers 28 are so adjusted that at an opening angle of approximately 30° they are from below, laterally at an incline, directed upon the supporting rollers of the garland roller sets 2. The control microphone comprises an amplifier and a changeable frequency filter which make it possible to suppress the low frequency of the channel noises occurring during the operation.

For listening and ascertaining the interfering noises there may be provided an earphone.

The ultrared installation operates with ultrared sensitive photoelectric cells which receive heat rays from the rollers having a temperature of 180° C. or more. The daylight radiation is weakened by ultrared filters to such an extent that it will not interfere with the measurements. If a roller having a temperature in excess of which 180° C. is within the receiving range of an ultrared cell, an acoustic and/or optical signal is initiated in the servicing carriage and is maintained until it is extinguished by hand.

The servicing carriage may operate at relatively high speed inasmuch as the ultrared installation corresponds very quickly. The servicing movement may generally be effected all the faster the greater the distance is between the garland roller sets 2.

When the servicing carriage has already passed by the roller initiating the signal, the said carriage is braked and the signalling installation is extinguished. The carriage now slowly moves back until the signal is initiated again.

When exchanging a garland roller set, naturally the respective corrugated sheet metal 4 is lifted off.

The servicing carriage may be provided with a device, for instance, a water balance or spirit level which will indicate to the conductor a possible unilateral lowering of the belt supporting frame. Such errors are conveyed to a central control stand. In order to make it possible that these errors can later be found easily, the individual conveyor streets are subdivided into sections and designated correspondingly.

It is, of course, to be understood that the present invention is, by no means, limited to the particular arrangement shown in the drawings, but also comprises any modifications within the scope of the appended claims.

What we claim is:

1. A servicing cart for exchanging a garland roller set of a belt conveyor having rail means extending in the longitudinal direction of said belt conveyor, which includes: a frame provided with wheels and adapted to be placed on said rail means and to be moved thereon, first hoisting means supported by and located on one side of said cart and adapted to receive and hold suspended thereon a first garland roller set so that the roller axes of said roller set are substantially vertical, second hoisting means supported by and arranged on the other side of said cart and opposite said first hoisting means, said second hoisting means being operable to receive and hold suspended a second garland roller set so that the roller axes thereof are vertical, and means operatively connected both to said first and second hoisting means and operable with complementary drive relationship to cause one of said hoisting means to carry out a gathering operation while simultaneously causing the other hoisting means to carry out to the same extent a let out operation.

2. A servicing cart for exchanging a garland roller set of a belt conveyor having rail means extending in the longitudinal direction of said belt conveyor, which includes: a frame provided with wheels and adapted to be placed on said rail means and to be moved thereon, first hoisting means supported by and located on one side of said cart and adapted to receive and hold suspended thereon a first garland roller set so that the roller axes of said roller set are substantially vertical, second hoisting means supported by and arranged on the other side of said cart and opposite said first hoisting means, said second hoisting means being operable to receive and hold suspended a second garland roller set so that the roller axes thereof are vertical, means operatively connected to said first and second hoisting means and operable to cause one of said hoisting means to carry out a gathering operation while simultaneously causing the other hoisting means to carry out to the same extent a let out operation, said first and second hoisting means comprising a yoke structure movable on said frame from an ineffective position to an effective position and vice versa and including two arms, roller means guided on said frame and respectively arranged at one end of said arms, pulley means respectively arranged on the other end of said arms, winch means carried by said frame, and cable menas extending from said winch means over each of said pulley means, said winch means being operable so as to gather up the cable means passing over one of said pulley means while simultaneously giving out the cable means passing over the other one of said pulley means.

3. A servicing cart according to claim 2, in which said arms in said effective position of said frame freely protrude beyond the respective adjacent end of said frame, whereas in said ineffective position of said frame said arms are at least to a major extend retracted onto said frame.

4. A servicing cart according to claim 2, in which each of said arms has a upwardly angled-off first section and also has a second section displaceably guided on said frame along a plane substantially parallel to the driving direction of said cart.

5. A servicing cart according to claim 2, in which said winch means includes two cable drums and also includes means interconnecting said drums and operable selectively to connect said two drums selectively for rotation in the opposite direction with regard to each other and for rotation in the same direction.

6. A servicing cart for exchanging a garland roller set of a belt conveyor having rail means extending in the longitudinal direction of said belt conveyor, which includes: a frame provided with wheels and adapted to be placed on said rail means and to be moved thereon, first hoisting means supported by and located on one side of said cart and adapted to receive and hold suspended thereon a first garland roller set so that the roller axes of said roller set are substantially vertical, second hoisting means supported by and arranged on the other side of said cart and opposite said first hoisting means, said second hoisting means being operable to receive and hold suspended a second garland roller set so that the roller axes thereof are vertical, means operatively connected to said first and second hoisting means and operable to cause one of said hoisting means to carry out a gathering operation while simultaneously causing the other hoisting means to carry out to the same extent a let out operation, supporting rollers arranged on opposite sides of said cart and supporting members supported by said cart and carrying said supporting rollers, said supporting members being adapted to be lifted from and lowered to the level below the conveyor belt of a belt conveyor and also being operable to move said supporting rollers below said belt of said belt conveyor to lift sections of said belt off the respective garland roller set of said belt conveyor.

7. A servicing cart for exchanging a garland roller set of a belt conveyor having rail means extending in the longitudinal direction of said belt conveyor, which includes: a frame provided with wheels and adapted to be placed on said rail means and to be moved thereon, first hoisting means supported by and located on one side of said cart and adapted to receive and hold suspended thereon a first garland roller set so that the roller axes of said roller set are substantially vertical, second hoisting means supported by and arranged on the other side of said cart and opposite said first hoisting means, said second hoisting means being operable to receive and hold suspended a second garland roller set so that the roller axes thereof are vertical, means operatively connected to said first and second hoisting means and operable to cause one of said hoisting means to carry out a gathering operation while simultaneously causing the other hoisting means to carry out to the same extent a let out operation, said cart having at least one side thereof provided with a downwardly extending arm, and means supported by said last mentioned arm and operable to indicate noises caused by damage to rollers of roller sets carrying the belt of a belt conveyor and also operable to indicate heat radiation caused by jamming of rollers pertaining to any of said roller sets.

References Cited
UNITED STATES PATENTS 2,820,282   1/1958   Schneider _____ 29—200 D JOHN F. CAMPBELL, Primary Examiner D. P. ROONEY, Assistant Examiner U.S. Cl. X.R.

29—200 B, 200 D, 401; 198—192